United States Patent
Talya et al.

(10) Patent No.: US 7,322,189 B2
(45) Date of Patent: Jan. 29, 2008

(54) WIDE BANDWIDTH FARMS FOR CAPTURING WAVE ENERGY

(75) Inventors: Shashishekara Sitharamarao Talya, Clifton Park, NY (US); Sumit Bose, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/311,874

(22) Filed: Dec. 19, 2005

(65) Prior Publication Data

US 2007/0137195 A1    Jun. 21, 2007

(51) Int. Cl.
*F03C 1/00*    (2006.01)

(52) U.S. Cl. .......................................... 60/496; 60/497
(58) Field of Classification Search .................. 60/495, 60/496, 497; 290/42, 53
See application file for complete search history.

(56) References Cited

U.S. PATENT DOCUMENTS

| | | | | |
|---|---|---|---|---|
| 4,137,005 A | * | 1/1979 | Comstock | 415/24 |
| 4,208,878 A | * | 6/1980 | Rainey | 60/496 |
| 4,464,578 A | * | 8/1984 | Masubuchi | 290/42 |
| 4,781,023 A | * | 11/1988 | Gordon | 60/506 |
| 5,512,795 A | | 4/1996 | Epstein et al. | |
| 5,548,177 A | | 8/1996 | Carroll | |
| 5,551,656 A | | 9/1996 | Taylor | |
| 5,552,657 A | | 9/1996 | Epstein et al. | |
| 5,578,889 A | | 11/1996 | Epstein | |
| 5,621,264 A | | 4/1997 | Epstein et al. | |
| 5,703,474 A | | 12/1997 | Smalser | |
| 5,770,893 A | * | 6/1998 | Youlton | 290/53 |
| 5,814,921 A | | 9/1998 | Carroll | |
| 6,194,815 B1 | | 2/2001 | Carroll | |
| 6,201,336 B1 | | 3/2001 | Burns | |
| 6,229,225 B1 | | 5/2001 | Carroll | |
| 6,291,904 B1 | | 9/2001 | Carroll | |
| 6,300,689 B1 | | 10/2001 | Smalser | |
| 6,360,534 B1 | | 3/2002 | Denniss | |
| 6,376,968 B1 | | 4/2002 | Taylor | |
| 6,424,079 B1 | | 7/2002 | Carroll | |
| 6,476,511 B1 | | 11/2002 | Yemm et al. | |
| 6,522,048 B1 | | 2/2003 | Burns et al. | |
| 6,528,928 B1 | | 3/2003 | Burns et al. | |

(Continued)

FOREIGN PATENT DOCUMENTS

| WO | WO 97/19474 | 5/1997 |
|---|---|---|
| WO | WO 02/057623 A1 | 7/2002 |
| WO | WO 2004/088129 A1 | 10/2004 |

OTHER PUBLICATIONS

JP 2002-257022 Publication Date Nov. 9, 2002. "Wave Energy Transducer Utilizing Pressure Difference" (Abstract Only).

*Primary Examiner*—Hoang Nguyen
(74) *Attorney, Agent, or Firm*—Ann M. Agosti; Patrick K. Patnode (57) ABSTRACT

Disclosed herein is a system comprising a central controller; and a plurality of devices for capturing wave energy and converting into another form of energy; wherein the central controller is in operative communication with the plurality of devices to adjust an energy capturing capability of a device. Disclosed herein too is a method comprising determining wave conditions in a fluid media; and tuning in real-time an energy capturing device to resonate at a selected frequency present in the fluid media; wherein the energy capturing device is disposed in the fluid media.

47 Claims, 7 Drawing Sheets

U.S. PATENT DOCUMENTS

| | | |
|---|---|---|
| 6,617,705 B1 | 9/2003 | Smalser et al. |
| 6,731,019 B2 | 5/2004 | Burns et al. |
| 6,768,216 B1 | 7/2004 | Carroll et al. |
| 6,768,217 B2 | 7/2004 | Chalmers et al. |
| 6,772,592 B2 | 8/2004 | Gerber et al. |
| 6,930,407 B2 * | 8/2005 | Panholzer .................... 290/53 |

* cited by examiner

WIDE BANDWIDTH FARMS FOR CAPTURING WAVE ENERGY

BACKGROUND

This disclosure is related to wide bandwidth farms for capturing ocean wave energy. More specifically this disclosure relates to maximizing the energy generated by ocean wave farm devices.

Proposed ocean energy device farms generally contain devices that are of the same size and have the same capacity. The devices are individually controlled to maximize the energy capture for each device. In the case of wave device farms, all devices are generally of the same design and the same size and are intended to capture energy from the same narrow bandwidth of wave frequencies even though the incident waves comprise of a wide range of frequencies. As a result, the energy in waves that lie outside of this selected frequency range are not captured efficiently resulting in a net energy capture that is significantly less than the maximum amount of energy that can potentially be captured.

It is therefore desirable to design ocean energy device farms that can simultaneously capture energy from a wide range of frequencies available in waves. In other words, it is desirable to have energy device farms comprising a number of devices that can simultaneously extract as much energy from incident waves at any given time. It may be necessary to have multiple types of devices for this purpose.

SUMMARY

Disclosed herein is a system comprising a central controller; and a plurality of devices for capturing wave energy and converting into another form of energy; wherein the central controller is in operative communication with the plurality of devices to adjust an energy capturing capability of a device.

Disclosed herein too is a method comprising determining wave conditions in a fluid media; and tuning in real-time an energy capturing device to resonate at a selected frequency present in the fluid media; wherein the energy capturing device is disposed in the fluid media.

Disclosed herein too is a system comprising a sensor; a central controller; and a plurality of devices disposed in a fluid media for capturing wave energy from the fluid media and converting into another form of energy; wherein the central controller is in operative communication to adjust an energy capturing capability of the system by changing a device based upon information received an input received from a sensor.

Disclosed herein too is a method comprising determining wave conditions in a fluid media based upon information receiver from a sensor or a forecast; and changing a configuration of an energy capturing device or changing the device based upon information received from the sensor or the forecast.

DETAILED DESCRIPTION OF FIGURES

DETAILED DESCRIPTION

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system comprising a recycle loop.

Disclosed herein are energy device farms (hereinafter farms) that comprise a number of different devices having similar or different designs and that are capable of responding to different frequencies available in fluid waves during the energy collection process. In one embodiment, the devices can be tuned real-time by adjusting the device natural frequency thereby permitting the device to capture a larger portion of the available energy under prevailing conditions. By placing a large number of such tunable devices (each of which is capable of being tuned to a different natural frequency) in the waves, a wide range of energies available from the spectrum of energies present in the waves can be simultaneously captured. The ability to tune the natural frequency of a device increases the amount of energy captured in a farm at any given time over a comparative farm comprising comparative devices that are programmed to respond to only a selected frequency range present in the waves.

The general time-period for energy captured from waves is about 0.5 to about 25 seconds. The time period is inversely related to the frequency. In one embodiment, the time period for energy captured from waves is about 1 to about 20 seconds. An exemplary time period range for energy that can be captured from waves is about 5 to about 15 seconds. The term fluid waves applies to any waves such as, for example, ocean waves, river waves, or the like, in which the devices can be disposed.

Figure 1:
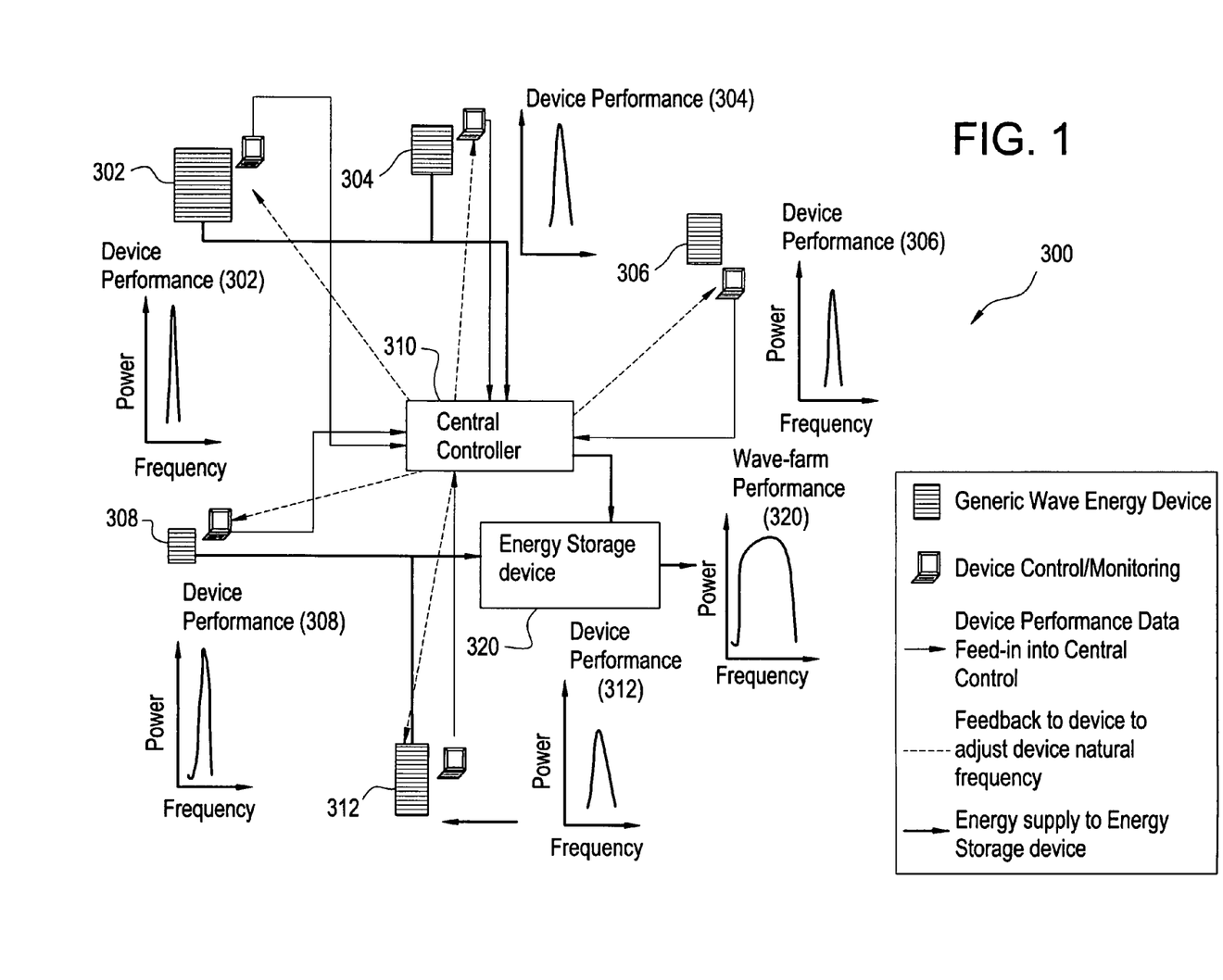
FIG. 1 is an exemplary depiction of a system comprising a variety of devices that can simultaneously extract energy from waves at different frequencies; the system also comprises a central controller 310 for tuning the devices to simultaneously extract different bands of energy.

With reference now to the FIG. 1, a farm 300 comprises a plurality of devices. The term "plurality" means two or more devices. In one embodiment depicted in the FIG. 1, the farm 300 comprises "n" number of devices numbered 302, 304, 306, 308, 312, and the like, for capturing wave energy at a plurality of different frequencies. The devices are in operative communication with a central controller 310 and an energy storage device 320. The term "operative communication" embodies various types of communication that are employed between a general control system and a device. Operative communication includes optical communication, electrical communication, mechanical communication, pneumatic and hydraulic communication, magnetic communication, electro-mechanical communication, electro-optical communication, electromagnetic communication, or the like, or a combination comprising at least one of the foregoing forms of operative communication. In one embodiment, the central controller 310 communicates with the devices via a feedback loop.

The number of devices "n" can be an amount of greater than or equal to about 2. In one embodiment, "n" can be an amount of greater than or equal to about 10. In another embodiment, "n" can be an amount of greater than or equal to about 50. In yet another embodiment, "n" can be an amount of greater than or equal to about 100. In yet another embodiment, "n" can be an amount of greater than or equal to about 1,000.

In one embodiment, the farm can comprise groups of devices having a similar design but which are capable of independently responding to different frequencies available in the waves. Each group of devices has characteristics that permit the group to take advantage of a prevailing set of wave conditions at a given time. Thus, for example, a first group of 10 devices can take advantage of a first band of energy, while a second group of 15 devices can take advantage of a second band of energy and a third group of 5 devices can take advantage of a third band of energy, wherein the first, second and third bands of energy all exist simultaneously in the waves. In this embodiment, each band of energy is assumed to have a different frequency. The term "band of energies" refers to a narrow range of frequencies that a particular device can resonate at and at which the device absorbs substantially all of the energy available to it from the waves.

As noted above, the devices can be tuned real-time by virtue of information collected by the central controller 310 from a sensor, which senses the prevailing conditions (not shown). The sensor information can also be used by a software algorithm to produce short-term or long-term energy forecasts. The central controller 310 communicates with the devices promoting a change in the natural frequency of the devices thereby enabling the devices to tap into a new band of energy that is different from a previous band of energy being tapped by the devices. Thus the number of devices extracting energy from the waves can be changed or optimized at any given time depending upon prevailing conditions. Thus, for example, at any time T1, a first group of 10 devices can take advantage of a first band of energy, while a second group of 15 devices can take advantage of a second band of energy and a third group of 5 devices can take advantage of a third band of energy, wherein the first, second and third bands of energy all exist simultaneously in the waves. After a time T2, when different conditions prevail in the waves, the first group of 10 devices can be tuned so as to have 5 devices responding to a fifth band of energy while 5 other devices can be tuned to respond to a $6^{th}$ band of energy. If the central controller 310 determines (based on information from the sensor or the forecasting algorithm) that there are no other bands of energy available to tap into, the second group and the third groups of devices can be kept idle or disconnected or removed from the farm. This ability to deploy devices when desired and to remove them when favorable conditions do not prevail can be used to increase the life of the devices and the farm. This can be applied similar to a power system wherein the ramp up or ramp down of a device can be determined by the forecast of supply and demand.

In this manner, the central controller 310 can direct "n" groups of devices on a farm to absorb "n" different frequencies or bands of energy available in the waves; wherein n is any positive integer. In one embodiment, the central controller 310 can direct "n" groups of devices on a farm to absorb "m" different frequencies or bands of energy available in the waves; wherein n and m is any positive integer. Thus, the central controller 310 can direct "n" groups of devices, wherein each group comprises "m" devices to absorb from n to a maximum of n×m different frequencies or bands of energy; wherein both n and m are positive integers.

Both n and m can be greater than or equal to about 1. In another embodiment, at least one of n or m can be greater than or equal to about 10 if desired. In yet another embodiment, at least one of n or m can be greater than or equal to about 100 if desired. In yet another embodiment, at least one of n or m can be greater than or equal to about 1,000 if desired.

As noted above, different devices can be used for capturing wave energy and converting it into a useful form of energy, such as, for example, electricity. The devices can be categorized as heaving devices, heaving and pitching devices, pitching devices, oscillating water columns, and surge devices. Examples of such devices are a buoy type float dependent wave energy device, an oscillating water column, a point absorber, a terminator, or the like, or a combination comprising at least one of the foregoing devices.

Figure 2:
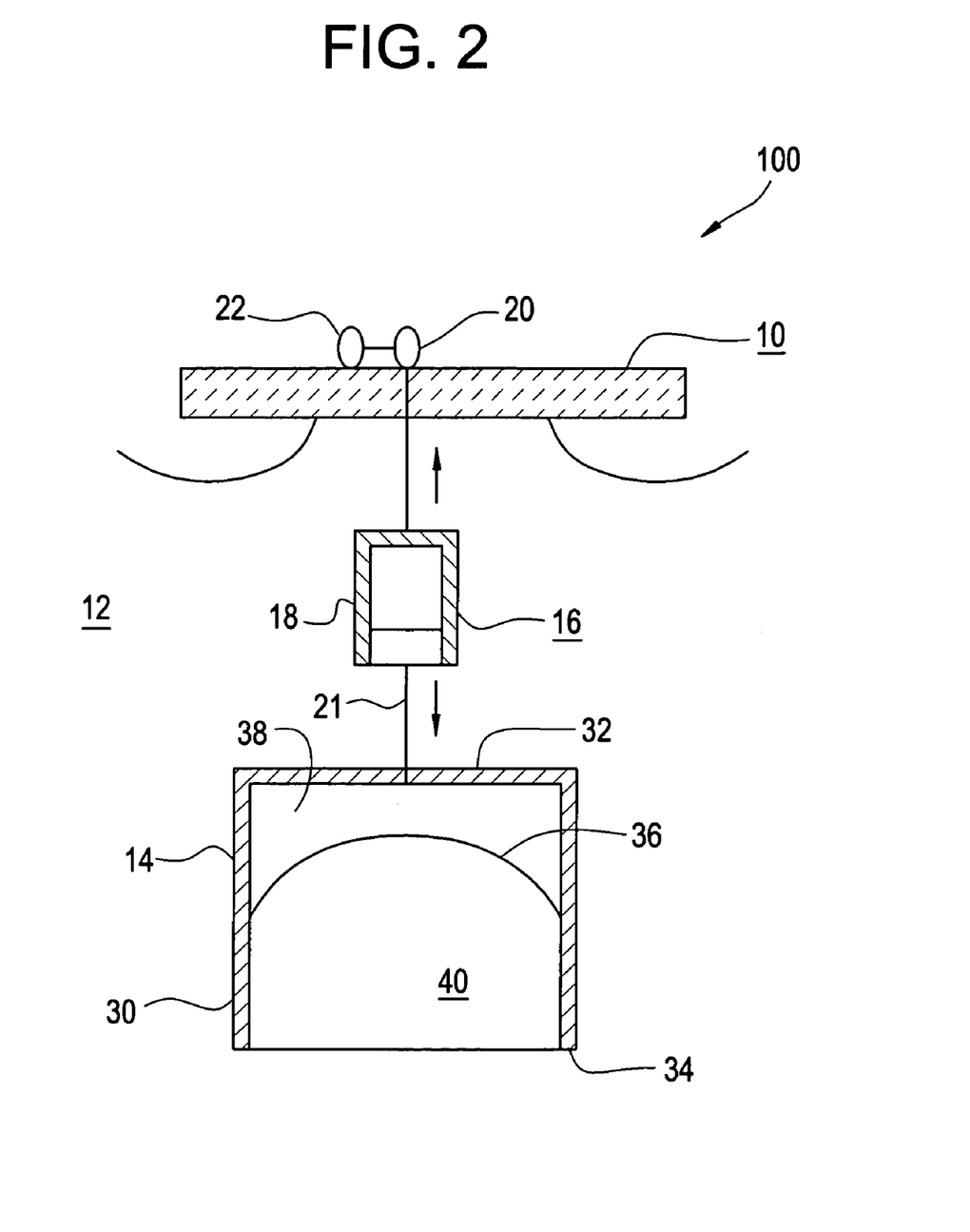
FIG. 2 is an exemplary depiction of one embodiment of a buoy type float dependent wave energy device 100.

In one exemplary embodiment, depicted in the FIG. 2, a buoy type float dependent wave energy device 100 comprises a float 10 on the surface of a body 12 of water, preferably one experiencing large and constant surface waves. The purpose of the buoy type float dependent wave energy device 100 is to capture energy present in surface waves by causing relative movements between a wave energy capturing mechanism and an energy transducer. Different known energy transducers can be used. The system also includes a wave energy converter (WEC) 14 and an energy transducer for converting relative movements between the WEC 14 and the float 10 into useful energy. In the embodiment depicted in FIG. 2, such an energy converting means comprises a hydraulic cylinder 16 comprising a casing 18 and a piston 20 respectively rigidly connected to the float 10 and to the WEC 14. Relative movements between the float and the WEC cause a pumping of the hydraulic cylinder 16 for pressurizing a hydraulic fluid used for driving a hydraulic motor 21 driving, in turn, an electrical generator 22 for generating electrical energy. In the schematic illustration of FIG. 2, the hydraulic cylinder 16 is shown suspended in the water beneath the float 10. In actual use, the cylinder 16 is preferably disposed within the float 10 itself with, e.g., the casing 18 rigidly attached to the float 10 and the piston 20 extending downwardly to the WEC 14.

The WEC 14 shown in the FIG. 2 comprises an inverted, cup-shaped shell 30 having a closed top end 32 and an open bottom end 34. In this embodiment, the WEC is completely submerged. A compressible fluid, preferably air, is trapped within the upper end 32 of the shell 30 by means of a flexible membrane 36, e.g., a sheet of rubber, plastic or other suitable material, peripherally attached to the inside wall of the shell 30 and completely separating the air chamber 38 from the column 40 of water filling the lower portion 34 of the shell 30.

Examples of plastics that may be used for the flexible membrane 36 are thermoplastic polymers, thermosetting polymers, blends of thermoplastic polymers, or blends of thermoplastic polymers with thermosetting polymers. The polymeric material can comprise a homopolymer, a copolymer such as a star block copolymer, a graft copolymer, an alternating block copolymer or a random copolymer, ionomer, dendrimer, or a combination comprising at least one of the foregoing. The polymeric material may also be a blend of polymers, copolymers, terpolymers, or the like, or a combination comprising at least one of the foregoing.

Examples of thermoplastic polymers that can be used in the polymeric material include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polypropylenes, polybutadienes, polyisoprenes, polyethylenes, polyethylene terephthalates, polyvinylidene fluorides, polysiloxanes, or the like, or a combination comprising at least one of the foregoing thermoplastic polymers.

In one embodiment, by changing the composition of the flexible membrane 36, it stiffness can be varied thereby varying the ability of the device 100 to respond to different bands of energy transmitted by the waves. By changing the stiffness of the flexible membrane 36, the device can be made to respond to energies having a different frequency. For example, if the composition of the membrane has a low elastic modulus of less than $10^5$ gigapascals (GPa) and is highly elastic, the device 100 can respond effectively to lower frequencies present in the waves, while if the composition has an elastic modulus of greater than or equal to about $10^6$ gigapascals (GPa), it can respond more effectively to higher frequencies present in the waves.

In another embodiment, all of the devices 100 can be provided with a flexible membrane 36 having a single composition. The elasticity of the membrane can however be varied by changing the temperature of the membrane by heating it electrically. For example, the membrane may be made electrically conductive be filling it with electrically conductive filler such as carbon nanotubes, carbon black, or the like. A battery in electrical communication with the central controller 310 can transmit an electrical current to the membrane 36 thereby heating it and changing its elastic modulus. The device 100 can now be made to respond to a different energy band present in the waves. Thus the devices embodied in the FIG. 1 can be tuned in real-time while being employed on a farm or alternatively they can be tuned on-shore prior to being deployed on the farm.

Figure 3:
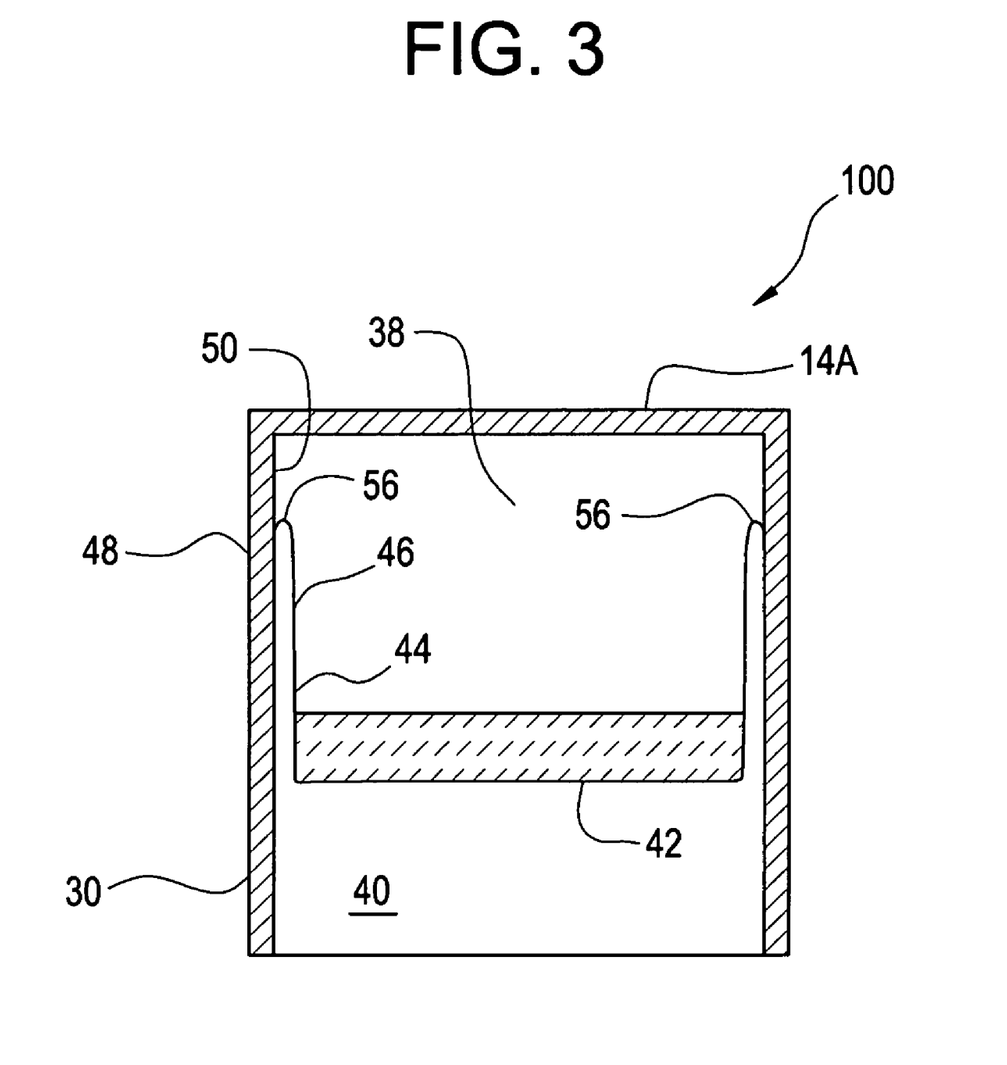
FIG. 3 is an exemplary depiction of another embodiment of a buoy type float dependent wave energy device 100 wherein the water column 40 is separated from the air chamber 38 by an impervious float 42 that floats on the surface of the water column 40.

A modification of the WEC 14 shown in FIG. 2 is shown in the FIG. 3. In the FIG. 3, a WEC 14 A is shown which is otherwise identical to the WEC 14 except that the water column 40 is separated from the air chamber 38 by an impervious float 42 which floats on the surface of the water column 40. The entire periphery of the float is hermetically sealed to the lower, inside surface 44 of a cylindrical sleeve 46, the upper outside edge 48 of which is hermetically sealed to the inside surface 50 of the shell 30.

The cylindrical sleeve 46 is folded over at a movable ("rollable") fold 56, and vertical movements of the float 42 are readily accommodated by changes in the vertical position of the fold 56. The cylindrical sleeve 46 is of a flexible, elastomeric material, and the sleeve is commercially available, being known as a flexible or rolling diaphragm. It is commercially available from the Marsh Bellofram Corp., Newell, W. Va. under the name "Bellofram Rolling Diaphragm".

In the FIG. 2, the membrane 36, and in the FIG. 3, the float 42-diaphragm 46 combination, are shown disposed interiorly of the WEC shell 30, thus subdividing the interior of the shell into two volumes 38 and 40. By changing the relative size of the two volumes 38 and 40, the capabilities of the device 100 to absorb different bands of energy from waves can also be changed as follows.

The compressed air within the air chamber 38 functions as a spring, and when the trough of the wave passes the device 100, the decreased water pressure at the bottom of the WEC allows the compressed air within the chamber to expand thereby increasing the volume of the chamber 38 and increasing the buoyancy of the WEC. An upward force is thus, in the present illustrative embodiment, applied against the hydraulic cylinder piston 20.

The WEC 14 thus vertically oscillates in response to the passing waves and cyclically pumps the hydraulic cylinder 16. The change in buoyancy of the WEC (providing the forces for generating energy) is a function of the volume of the water pumped into and out of the WEC in response to water pressure changes. The volume of water moving into and out of the WEC is a function of the volume of the air chamber 38. In the embodiments shown in the FIGS. 2 and 3, increasing the air chamber volume (for a given water column height) requires increasing the size of the WEC. To retain neutral buoyancy of the WEC, the shell 30 must be made correspondingly heavier.

Thus by changing the volume of the air chamber 38 without changing the size of the WEC, the buoyancy of the device 100 can be changed and it can correspondingly be tuned to absorb a different band of energies present in the waves. Thus, by changing the stiffness of the membrane 36 in FIG. 2, or the ratio of volumes of the chambers 38 and 40 in the FIGS. 2 and 3, the device 100 can be made to resonate to different bands of energies present in the waves.

Thus, in one embodiment, a farm can have a plurality of devices having the design of FIG. 2. One group of the plurality of devices can have a membrane 36 comprising a first composition giving them the capability to respond to a first band of energy, while another group of the plurality of devices can have a membrane 36 comprising a second composition giving them the capability to respond to a second band of energy, wherein both the first band of energy and the second band of energy are both simultaneously available in the waves. If the available bands of energy in the waves undergoes a change, the central controller 310 can drive (heat) the respective membranes 36 to different temperatures thereby changing their natural (resonant) frequencies and promoting energy absorption at the new frequencies.

In another embodiment, a farm can have a plurality of devices a first group of which have the design of FIG. 2 and a second group of which have the design of FIG. 3. Since the designs of each group are different they can be tuned to respond to different bands of energy present in the waves thereby transforming a greater amount of energy present in the waves to a useful form of energy.

Oscillating water columns can also be modified for purposes of extracting different bands of energy from the waves. An exemplary depiction of an oscillating water column 200 in shown in the FIGS. 4 through 13(b). The oscillating water column 200 is based on the principle that the continuous rising and falling of the tube on an ocean wave results in an air column which oscillates relative to the tube. This moving air column, or even the water column below which also effectively oscillates, can be harnessed and converted into power. Abstraction of power will then affect the water level in the tube.

Figure 4:
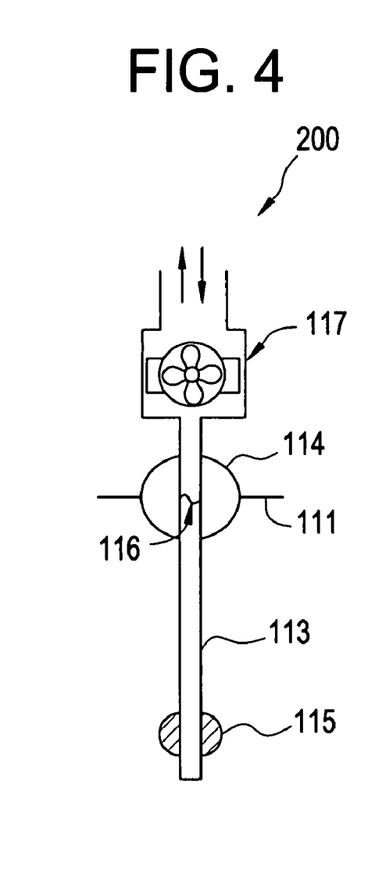
FIG. 4 represents an exemplary depiction of an oscillating water column 200 wherein a rectifying turbine 117 is located at the top of the tube 113.
Figure 5:
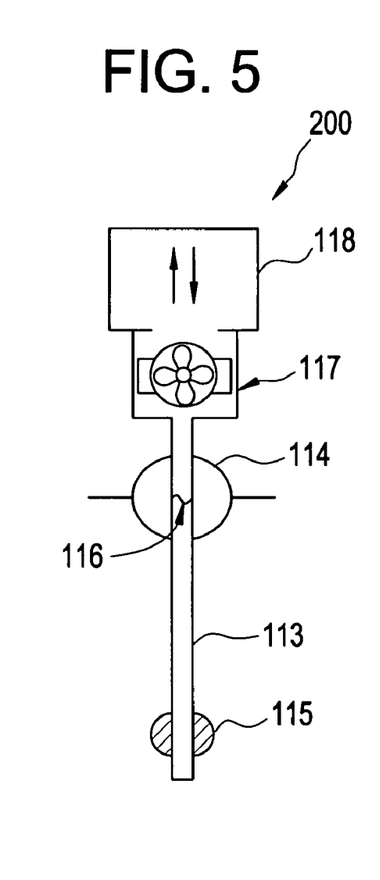
FIG. 5 represents another exemplary depiction of an oscillating water column 200 wherein the rectifying turbine 117 operates with a closed plenum chamber 118.

In FIG. 4, a rectifying turbine 117 is attached to the top of the tube 113. The rotor of the turbine 117 rotates in the same direction regardless of the air moving through it. It will be seen that the turbine 117 operates to atmosphere. However, in the FIG. 5 the turbine 117 operates with a closed plenum chamber 118 such that the oscillating air column is part of a closed system. This also gives the device a pneumatic spring effect. It would also be possible to replace the rectifying turbine with a conventional turbine in association with rectifying valves (e.g. flap, ball, fluidic gate, butterfly, or other types).

Figure 6:
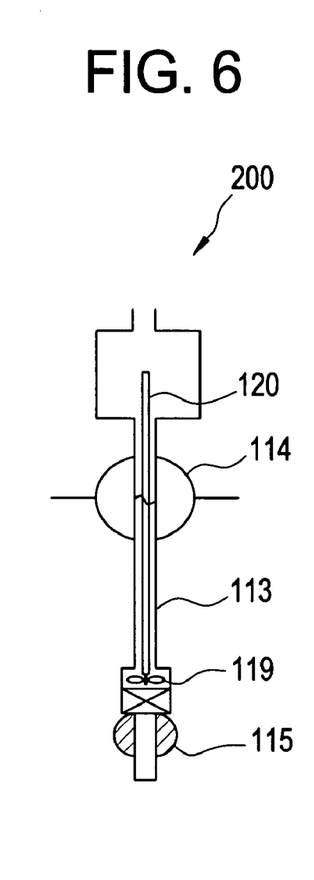
FIG. 6 represents another exemplary depiction of an oscillating water column 200 wherein the tube is provided with a water turbine 119 located in the tube 113 so as to be operated by the oscillating water column.

In the FIG. 6, the tube is provided with a water turbine 119 located in the tube 113 so as to be operated by the oscillating water column. The turbine 119 has a power take-off shaft 120 and the device may also incorporate mechanical, hydraulic or electrical rectification.

Figure 7:
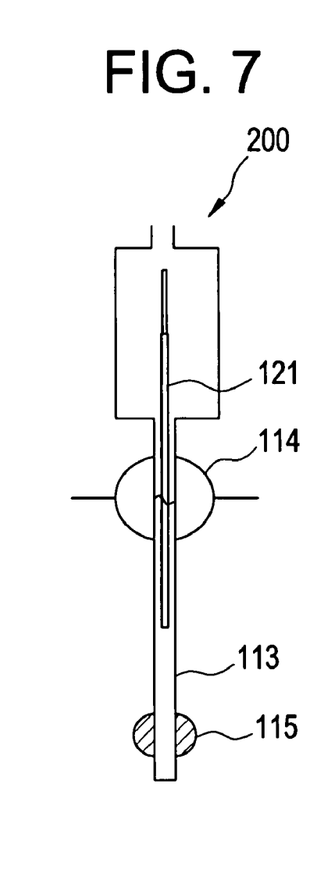
FIG. 7 represents another exemplary depiction of an oscillating water column 200 wherein the inner float 121 floats on the water column on the tube 113.

In the FIG. 7, there is an inner float 121 that floats on the water column in the tube 113. The vertical displacement of the inner float 121 in a wave can be harnessed mechanically, hydraulically or electrically to produce power.

In the FIGS. 8(a) and 8(b) there is shown a modified arrangement 130 which still incorporates a tube 113 which extends into the calm water below the effective wave base. The tube 113 also has a float 114, a ballast arrangement 115 and a rectifying turbine 117 at its upper end. Surrounding the turbine 117 and upper end of the tube 113 is a cup arrangement 131 of a plenum having a downwardly extending cylinder 132, which in turn is provided with float means 133. The cup arrangement and cylinder are rigidly attached to the tube 113 and/or turbine by means, which are not shown. It may, however, be desirable for there to be some possible movement between the cup and cylinder for adjustment and tuning purposes.

When put into water the cylinder extends into the water and the arrangement 130 is such that it floats with the tube 113 generally upright. An optional one-way valve 134 may be provided, which is such that the inside of the cup member 131 is opened to atmosphere when inside pressure falls below atmospheric.

Figures 8A, 8B:
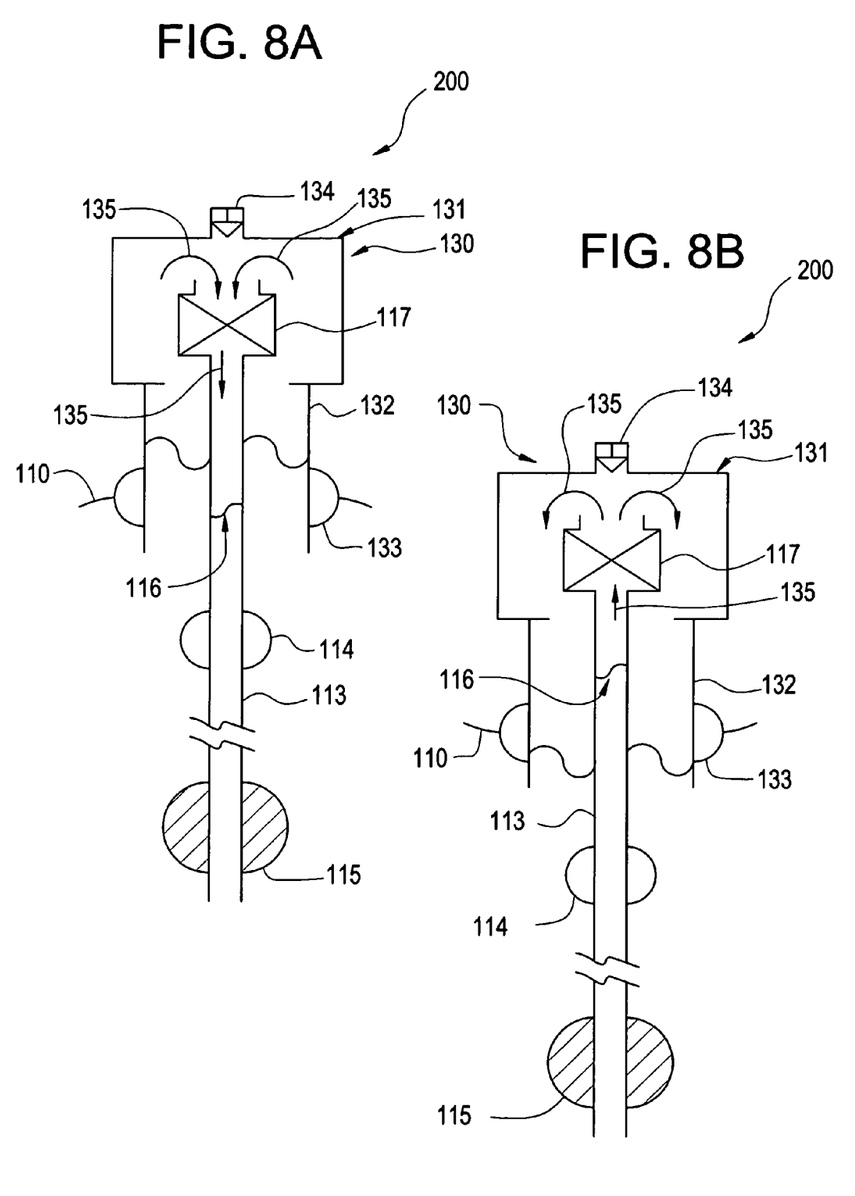
FIGS. 8(a) and 8(b) represents another exemplary depiction of an oscillating water column 200 in peak and trough conditions respectively.

When the arrangement rises towards the peak of a wave (FIG. 8(a)), water surges upwards in the cylinder 132, often to a level above the water level of the wave, whilst at the same time the water level 116 in the tube 113 goes down relative to the turbine 117. When the arrangement 130 falls towards the trough of a wave (FIG. 8(b)) the water surges downwardly in the cylinder 132, often to a level below the water level of the wave, and there is a complementary rise of the water level 116 in the tube 113 relative to the turbine 117.

It will be appreciated that the water level in the cylinder acts rather like a piston on the air within the cup arrangement 131 and above the column of water in the tube 113. The arrows 135 indicate the general flow of air through the turbine 117 during such wave movements.

In use of the arrangement 130 the water level in the cylinder should stay within the cylinder at all times even in the lowest wave trough. If air enters or leaves the cup arrangement 131 via the lower margin of the cylinder 132 then the dynamics of the arrangement could be altered to undesirable effect.

The particular arrangement of floats 114, 133 and ballast 115 is illustrative only and would preferably be tunable so as to maximize the efficiency of the wave energy device in particular conditions. Also with reference to the FIGS. 8(a) and 8(b), it will be clear that the turbine 117 can be replaced by other suitable harnessing means.

The ballast 115 can also act as a drogue against lateral or vertical movement of the device and improve efficiency. The ballast 115 and/or cylinder 132 and/or the tube 113 could also be shaped or have an appropriate cross-section so as to orient the device in a particular way depending on prevailing winds or tidal streams. Alternatively or in addition, this could be achieved by the device having vanes for operation either by air or fluid flow.

Further embodiments will now be described with reference to the FIGS. 9 through 19 in which mean sea level is indicated by chain line 1000. The FIGS. 9 through 19 also have features common to FIGS. 8(a) and 8(b), i.e., the plenum cup member 131 and downwardly extending cylinder 132. The cylinder 132 may possibly include the float 133 of FIGS. 8(a) and 8(b), but for clarity the float is not shown in FIGS. 9 through 13.

Figure 9:
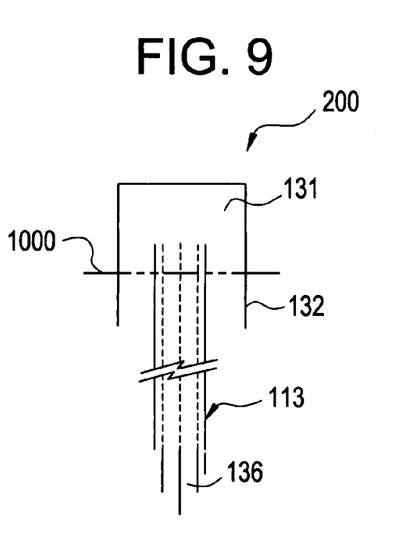
FIG. 9 represents another exemplary depiction of an oscillating water column 200 wherein the vertical section of the tube is divided into 8 radial segments.
Figure 9A:
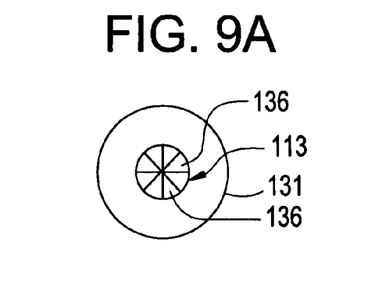
FIG. 9(a) is a section of the tube 113 taken at line 1000.

In FIG. 9 there is shown in vertical section a further embodiment of the floating tube 113 in which it is divided into eight radial segments or pipes 136, seven of which are truncated at their base to give pipes of different lengths—a "panpipes" set of different frequencies, the eighth segment remaining unshortened and extending below the effective wave bases. FIG. 9(a) is a section through the tube 113 of FIG. 9 taken at line 1000.

As shown in the embodiment of FIG. 9, that the range of wave frequencies to which the device is responsive is increased by virtue of the different resonant frequencies inherent in the pipe-like segments 136 of different lengths. This, in effect, facilitates broadband reception of desirable wave frequencies.

Furthermore, an assembly of pipes 136 of different lengths will allow the possibility of harmonic interaction, i.e. interference or beat frequencies, which could contribute to the desirable objective of extending the range of sea profiles or locations where the device may be usefully deployed. Nevertheless, for optimum efficiency, it is important for tubes 113 having multiple radial segments 136 of different lengths that at least one segment projects deep enough to be able to enter the relatively still water level of the effective wave base.

Figure 10:
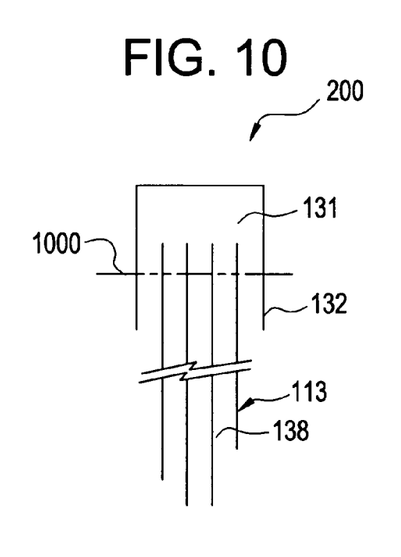
FIG. 10 represents another exemplary depiction of an oscillating water column 200 in which the vertical column is constructed from parallel sets of tubes.
Figure 10A:
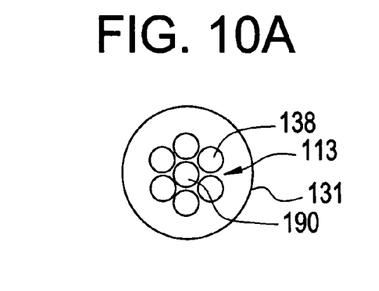
FIG. 10(a) is a section of the tube 113 taken at line 1000.

A further advantage of the embodiment of FIG. 9 is that the tube structure 113 has inherent structural strength by virtue of its segmentation. In FIG. 10 there is shown in vertical section another embodiment of the tube 113 in which it is constructed of a bundle of pipes 138 of different lengths, one of the pipes being long enough to extend below the effective wave base. FIG. 10(a) is a section through the tube 113 of FIG. 10 taken at line 1000. As with the FIG. 9, the range of wave frequencies to which the device is responsive is increased by virtue of the different resonance frequencies inherent in the varying length pipes 138. The possibility of harmonic interaction also exists. The bundle of pipes 138 also has an inherently high degree of mechanical strength.

Figure 11:
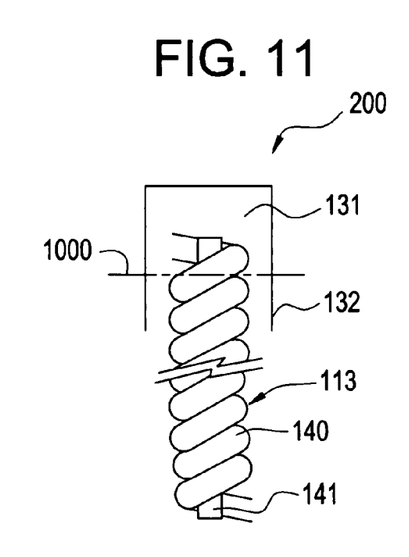
FIG. 11 represents another exemplary depiction of an oscillating water column 200 in which the tube 113 is formed from a pipe or a hose 140 helically wound around a central blank core.
Figure 11A:
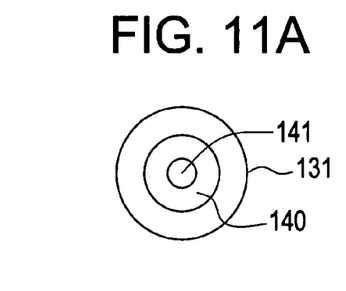
FIG. 11(a) is a section of the tube 113 taken at line 1000.

FIG. 11 shows in side view a tube 113 formed from a pipe or hose 140 helically wound around a central blank core 141. This has the advantage that the overall length of the water column can be substantially increased, with a lower resonance frequency, relative to the vertical height of the tube. The FIG. 11(a) is a section through the tube 113 of FIG. 11 taken at line 1000. In an alternative arrangement there may be provided two or more intertwined hoses 140, possibly of different lengths.

Figure 12:
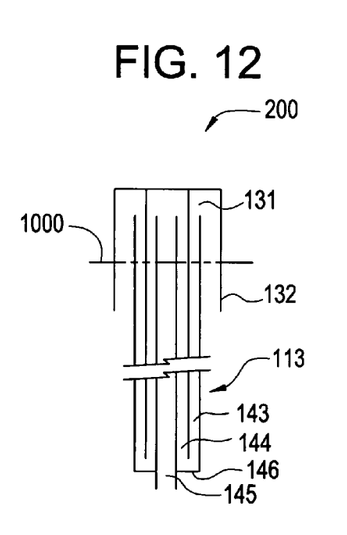
FIG. 12 represents another exemplary depiction of an oscillating water column 200 wherein the tube 113 comprises a bundle of concentric pipes 143, 144 and 145 respectively.
Figure 12A:
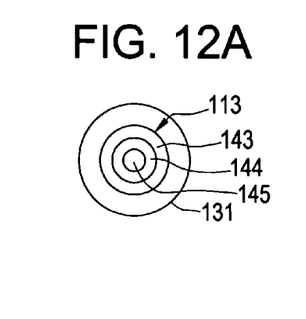
FIG. 12(a) is a section of the tube 113 taken at line 1000.
Figure 13:
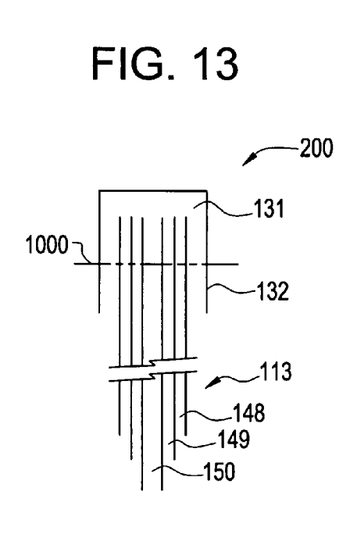
FIG. 13 represents another exemplary depiction of an oscillating water column 200 wherein the tube 113 comprises a bundle of concentric pipes 148, 149 and 150 having bottom ends trimmed to have a "panpipes" appearance.
Figure 13A:
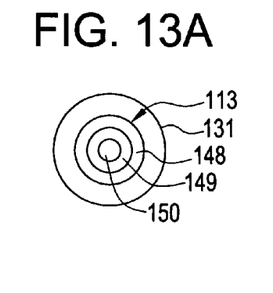
FIG. 13(a) is a section of the tube 113 taken at line 1000.

The FIG. 12 shows a tube 113 comprising a bundle of concentric pipes 143, 144, 145. The outer pipe 143 is closed off at its lower end by a plate 146 which have a central aperture down through which the central pipe 145 passes to below the effective wave base. The middle pipe 144 does not extend down as far as the plate 146, but all three pipes are open at their top end. Hence, the pipes 143, 144, 145 define an annular continuous passage, which puts the water columns within the pipes in series, rather than in parallel as in FIGS. 9 and 10. This particular construction of the tube 113 enables onshore tuning. FIG. 12(a) is a section through the tube of FIG. 12 taken at line 1000. The FIG. 13 shows a tube 113 comprising a bundle of concentric pipes 148, 149, 150 wherein the bottom ends of the pipes are trimmed from the centre outwards to give a "panpipes" effect. Here again the length of the pipes can be controlled to tune the device. Again, the central pipe 150 extends to below the effective wave base FIG. 13(a) is a section through the tube 113 of the FIG. 13 taken at line 1000.

Thus, the FIGS. 4 through 13 above show various embodiments of oscillating water columns that can be tuned to various frequencies in order to extract energy from waves. The embodiments depicted in the FIGS. 4 through 13 are generally tuned prior to deployment on the farm.

As described above, various embodiments of the oscillating water columns described above in the FIGS. 4 through 13 can be simultaneously deployed along with various embodiments described above in the FIGS. 2 and 3. Other design variations are also possible and can be deployed when desirable. In general, the energy capturing devices can be tuned by changing the temperature, weight, density, volume, dimensions, geometry, electrical conductivity, thermal conductivity, or the like, of a component contained within the device or in communication with the device. Combinations that involve changing at least one of the temperature, weight, density, volume, dimensions, geometry, electrical conductivity, thermal conductivity, or the like, of a component contained within the device or in communication with the device may also be made in order to tune the device.

All of the various devices deployed at any given time can be controlled or programmed via a central controller 310 as depicted in the FIG. 1. As can be construed from the aforementioned detailed descriptions of the various devices, some of the devices can be tuned real-time, while others can be programmed prior to deployment and can be manually or automatically exchanged with other more effective devices depending upon prevailing and predicted conditions on the farm.

As noted above, the central controller 310 is in operative communication with the "n" devices deployed in a particular farm. In one embodiment, the central controller 310 comprises a computer that communicates with the devices on the farm. The computer can execute an optimal control algorithm with feedback that facilitates increasing device life while at the same time improving energy capture.

In one embodiment, the central controller 310 can transmit signals to and receive information from the devices or from sensors (not shown) located on the farm. The sensors can be located on the devices or can be located independently away from the devices. The sensors generally provide information about prevailing conditions on the farm or at exterior points beyond the farm. Exemplary sensors are pressure sensors, acoustic Doppler sensors, or the like, or a combination comprising at least one of the foregoing devices. The central controller 310 can also adjust the positioning and locations of the devices on the farm via pneumatic devices, electrical motors, servo-motors, or the like. In another embodiment, the central controller 310 can optimize device performance based upon past performance during similar prevailing conditions.

Based on information about prevailing conditions received from the sensors, the central controller 310 can tune devices on the farm to absorb a greater amount of energy present in the waves. In one embodiment, the devices can be tuned real-time based upon information received from the sensors. In another embodiment, information received from the central controller 310 can be used to manually replace certain devices with other devices that are more suited to absorb energy from the waves under the prevailing conditions. In yet another embodiment, the central controller 310 can direct the automated repositioning of devices within the farm in order to optimize energy absorption.

With reference now again to the FIG. 1, the energy simultaneously or sequentially absorbed from the "n" devices located on the farm can be converted into a useful form and stored for later use when such energy is desired. In one embodiment, the mechanical motion of the piston in the FIG. 2 or the mechanical motion of the air column in the FIGS. 4 through 13 can be converted into electrical energy via an electrical generator (not shown) that is in communication with a turbine disposed on the device. An optional energy storage device 320, then helps the electrical generator to manage the deficit of demand (electrical load) and supply (energy resource). In one embodiment, the energy absorbed by the devices can be converted to electrical energy and stored on an electrical grid located off-site.

In one embodiment, the central controller 310 receives input information, which is processed to provide output information to the devices in a feedback loop. In one embodiment, an operator can provide the input information. For example, an operator can enter input information about the prevailing and/or predicted conditions. In another embodiment, a device can provide the input information. For example, the device can provide information about its operating capability, energy absorbance performance, local prevailing conditions, or the like, or a combination comprising at least one of the foregoing. In another embodiment, a sensor provides the input information. In one embodiment, the sensor is included within the farm. For example, the sensor can be disposed on or near a device. In another embodiment, the sensor can be disposed at a site that can be independent of a device.

In one embodiment, the central controller 310 is capable of forecasting the prevailing conditions. In another embodiment, the central controller 310 can change the devices on the farm to absorb a greater amount of energy based on the forecast of the prevailing conditions. For example, the central controller 310 can change the devices on the farm by repositioning a device, adding a device, removing a device, replacing a device with another device, or the like, or a combination comprising at least one of the foregoing changes.

In one embodiment, the central controller 310 can tune the devices on the farm in real-time based on the forecast of the prevailing conditions. For example, the central controller 310 can tune a device by adjusting the natural frequency of the device thereby permitting the device to capture a larger portion of the available energy based on the forecast of the prevailing conditions. In another embodiment, the central controller 310 can adjust the devices on the farm by a combination of actions comprising changing a device as well as tuning the device to absorb a greater amount of energy based on the forecast of the prevailing conditions.

In one embodiment, the central controller 310 is a learning device that can optimize devices utilized on the farm based on a stored history of conditions in the farm as well as a stored history of actions taken in the past as conditions on the farm varied. The stored history can include factors such as, for example, past energy absorption performance and/or past prevailing conditions. In one embodiment, the stored history includes factors from the most recent operation. In another embodiment, the stored history can include factors from earlier operations. In one embodiment, the factors can each have equal weight in an optimization algorithm. In another embodiment, the factors can each have different weights in an optimization algorithm. For example, factors from either the most recent or the earlier operations can have different weights.

The aforementioned system is advantageous in that it permits absorption of a wide band of different energies present in the waves at any given time. The system permits real-time tuning of the devices to maximize energy absorption capabilities depending upon prevailing conditions. Devices can be deployed on the farm or removed from deployment depending upon prevailing and predicted conditions, thereby increasing the life of the devices.

The system 300 comprising tunable devices permits an increased capture of energy present in the waves when compared with a comparative system that does not comprise tunable devices. In one embodiment, the system 300 comprising real-time tunable devices captures about 10% more energy than a comparative system that does not comprise real-time tunable devices. In another embodiment, the system 300 comprising real-time tunable devices captures about 50% more energy than a comparative system that does not comprise real-time tunable devices. In yet another embodiment, the system 300 comprising real-time tunable devices captures about 100% more energy than a comparative system that does not comprise real-time tunable devices. Since the system 300 comprising tunable devices can capture more energy than a comparative system that does not comprise tunable devices, it is possible to reduce the number of devices in the system 300 that can be used to capture a given amount of energy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system comprising:
   a central controller; and
   a plurality of groups of devices for capturing wave energy, and converting into another form of energy; wherein the central controller is in operative communication with the plurality of groups of devices to adjust an energy capturing capability of each group of devices, such that each group of devices captures energy from within an energy frequency band that is unique to that group and that is simultaneously existing within a plurality of energy frequency bands within a wave at a fixed moment in time.

2. The system of claim 1, wherein the device is a heaving device, a heaving and pitching device, a pitching device, an oscillating water column, a surge device, or a combination comprising at least one of the foregoing devices.

3. The system of claim 1, wherein the device is a buoy type float dependent wave energy device, a point absorber, a terminator, or a combination comprising at least one of the foregoing devices.

4. The system of claim 1, wherein the device is equipped with a turbine for converting wave energy into another form of energy.

5. The system of claim 4, wherein the turbine is in operative communication with an electrical generator.

6. The system of claim 5, wherein an energy storage device helps the electrical generator to manage the deficit of demand and supply.

7. The system of claim 1, wherein the energy capturing capabilities of each device can be tuned real-time.

8. The system of claim 7, wherein the device can be tuned real-time upon receiving a signal from the central controller.

9. The system of claim 8, wherein the device absorbs a different band of wave energy after tuning.

10. The system of claim 8, wherein the device absorbs energy at a different time period after tuning.

11. The system of claim 10, wherein the time period is about 0.5 seconds to about 25 seconds.

12. The system of claim 1, wherein the central controller communicates with the devices via optical communication, electrical communication, mechanical communication, pneumatic and hydraulic communication, magnetic communication, electro-mechanical communication, electro-optical communication, electromagnetic communication, or a combination comprising at least one of the foregoing forms of communication.

13. The system of claim 1, wherein the central controller communicates with the devices via a feedback loop.

14. The system of claim 1, wherein the devices are greater than or equal to about 10 in number.

15. The system of claim 1, wherein the devices are greater than or equal to about 100 in number.

16. The system of claim 1, wherein the central controller can tune a first group of devices to absorb energy at a first frequency and a second group of devices to absorb energy at a second frequency.

17. The system of claim 1, wherein the central controller can tune "n" groups of devices to absorb at "n" different frequencies; where "n" is any positive integer.

18. The system of claim 1, wherein the central controller can tune "n" groups of devices, wherein each group comprises "m" different devices to absorb at n to a maximum of n×m different frequencies; wherein both n and m are integers.

19. The system of claim 1, wherein the central controller can tune "n" groups of devices to absorb at "m" different frequencies; where "n" and "m" is any positive integer.

20. The system of claim 1, further comprising an energy storage device.

21. The system of claim 1, wherein the central controller further comprises a forecasting system.

22. The system of claim 1, wherein the energy storage device is operative to store electrical energy.

23. The system of claim 1, wherein in the system captures an amount of greater than or equal to about 10% more energy than a comparative system that does not contain devices whose energy capturing capabilities can be changed real-time.

24. A method comprising:
determining wave conditions in a fluid media; and
tuning in real-time a plurality of groups of energy capturing devices, each group configured to resonate at a selected frequency within a respective frequency band that is unique to that group and that is selected from a plurality of energy frequency bands simultaneously present in the fluid media in response to the wave conditions in the fluid media; wherein each energy capturing device is disposed in the fluid media.

25. The method of claim 24, wherein the determining of wave conditions is performed by a sensor that is disposed on the energy capturing device or disposed in the fluid media.

26. The method of claim 24, wherein the determining of wave conditions is performed by a sensor and/or a forecasting algorithm based in a central controller; wherein the sensor is in operative communication with the central controller and further wherein the central controller is in operative communication with an energy capturing device.

27. The method of claim 24, wherein the determining of wave conditions is performed by a forecasting algorithm.

28. The method of claim 24, wherein the tuning is accomplished by a change in temperature.

29. The method of claim 24, wherein the tuning is accomplished by a change in weight, dimensions, geometry, buoyancy, temperature, density, of the energy capturing device.

30. The method of claim 24, wherein the tuning is accomplished by a change in weight, dimensions, geometry, buoyancy, temperature, density, of a component present in the energy capturing device.

31. The method of claim 24, wherein the tuning is accomplished by a change in weight, dimensions, geometry, buoyancy, temperature, density, of a component in communication with the energy capturing device.

32. The method of claim 24, wherein the timing is conducted according to a signal received from a controller.

33. The method of claim 32, wherein the controller is a computer.

34. An article that performs the method of claim 24.

35. A system comprising:
a sensor;
a central controller; and
a plurality of groups of devices disposed in a fluid media for capturing wave energy from the fluid media and converting into another form of energy; wherein the central controller is in operative communication to adjust an energy capturing capability of the system by changing each group of devices based upon information received at an input received from the sensor, such that each group of devices is configured to resonate at a frequency within a respective frequency band that is unique to that group and that is selected from a plurality of energy frequency bands simultaneously present in the fluid media.

36. The system of claim 35, wherein the changing the device is accomplished by repositioning a device, adding a device, removing a device, replacing one device with another device, or a combination comprising at least one of the foregoing changes.

37. The system of claim 35, wherein the device is a heaving device, a heaving and pitching device, a pitching device, an oscillating water column, a surge device, or a combination comprising at least one of the foregoing devices.

38. The system of claim 35, wherein the device is a buoy type float dependent wave energy device, a point absorber, a terminator, or a combination comprising at least one of the foregoing devices.

39. The system of claim 35, wherein the device is equipped with a turbine for converting wave energy into another form of energy.

40. The system of claim 39, wherein the turbine is in operative communication with an electrical generator.

41. The system of claim 35, wherein the system further comprises an energy storage device.

42. The system of claim 41, wherein the energy storage device helps the electrical generator to manage the deficit of demand and supply.

43. The system of claim 35, wherein the central controller is in operative communication with the devices via a feedback loop.

44. The system of claim 35, wherein the central controller is a computer.

45. A method comprising:
determining wave conditions in a fluid media based upon information received from a sensor or a forecast; and changing a configuration of a plurality of groups of energy capturing devices or changing the plurality of groups of devices based upon information received from the sensor or the forecast, such that each group of devices is configured to resonate at a frequency within a respective frequency band that is unique to that group and that is selected from a plurality of energy frequency bands simultaneously present in the fluid media.

46. The method of claim 45, wherein changing the configuration comprises repositioning the device.

47. The method of claim 45, wherein changing the device is accomplished by adding a device, removing a device, replacing one device with another device, or a combination comprising at least one of the foregoing changes.

* * * * *